United States Patent

Ide

[11] Patent Number: 5,905,919
[45] Date of Patent: May 18, 1999

[54] AUTOMATIC FOCUS DETECTING DEVICE

[75] Inventor: Masataka Ide, Hachioji, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,639

[22] Filed: Jun. 21, 1996

[30] Foreign Application Priority Data

Jun. 29, 1995 [JP] Japan .................................. 7-163908

[51] Int. Cl.$^6$ .................................................. G03B 13/36
[52] U.S. Cl. .......................................... 396/121; 396/104
[58] Field of Search .................................... 396/102, 104, 396/121–123; 348/332

[56] References Cited

U.S. PATENT DOCUMENTS

| | | | |
|---|---|---|---|
| 4,862,204 | 8/1989 | Ishida et al. ............................. | 396/104 |
| 4,905,032 | 2/1990 | Ishida et al. ............................. | 396/104 |
| 5,001,507 | 3/1991 | Iida et al. ................................. | 396/104 |
| 5,003,339 | 3/1991 | Kikuchi et al. ......................... | 396/122 |
| 5,130,735 | 7/1992 | Kusaka et al. .......................... | 396/104 |
| 5,396,336 | 3/1995 | Yoshii et al. ............................ | 396/121 |
| 5,585,882 | 12/1996 | Akashi .................................... | 396/121 |
| 5,589,911 | 12/1996 | Nonaka .................................... | 396/121 |

FOREIGN PATENT DOCUMENTS

| | | |
|---|---|---|
| 62-187829 | 8/1987 | Japan . |
| 63-17418 | 1/1988 | Japan . |
| 1-187521 | 7/1989 | Japan . |

*Primary Examiner*—Safet Metjahic
*Assistant Examiner*—Michael Dalakis
*Attorney, Agent, or Firm*—Frishauf, Holtz, Goodman, Langer & Chick

[57] ABSTRACT

An automatic focus adjusting device is adapted to detect focus information of an objective lens on the basis of two images of a subject. The device includes a photosensor having a number of pixels on which the two images are formed, a focus detecting area setup device for selectively setting up either of first and second focus detecting areas on the photosensor, the first focus detecting areas being initially set up and the second focus detecting areas being less in the number of pixels than the first focus detecting areas, an operation device for performing predetermined operations on outputs of the first focus detecting areas set up on the photosensor to provide focus information of the objective lens, an evaluator for evaluating whether the results of operations are proper or not, and a controller responsive to the evaluator for, when the results of operations are improper, causing the focus detecting area setup device to set up the second focus detecting areas on the photosensor and then causing the operation device to perform the operations on outputs of the second focus detecting areas. This device permits the time taken to detect the focus to be reduced without the need of making a low contrast scan even if the focus detection is impossible.

9 Claims, 13 Drawing Sheets

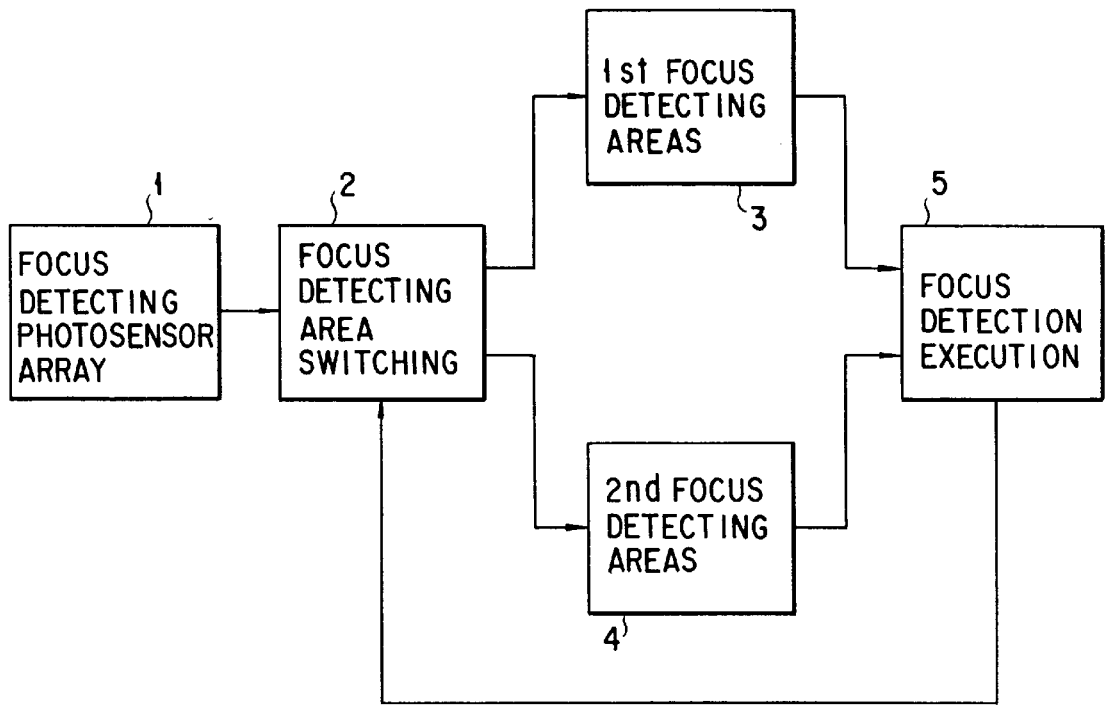
F I G. 1
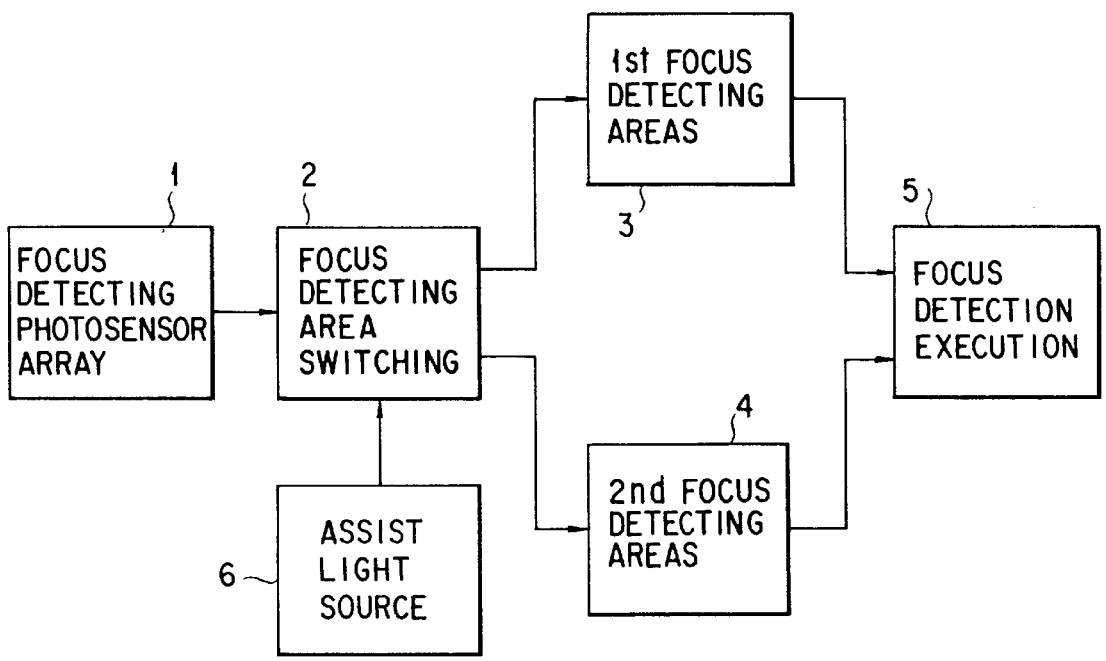
F I G. 2

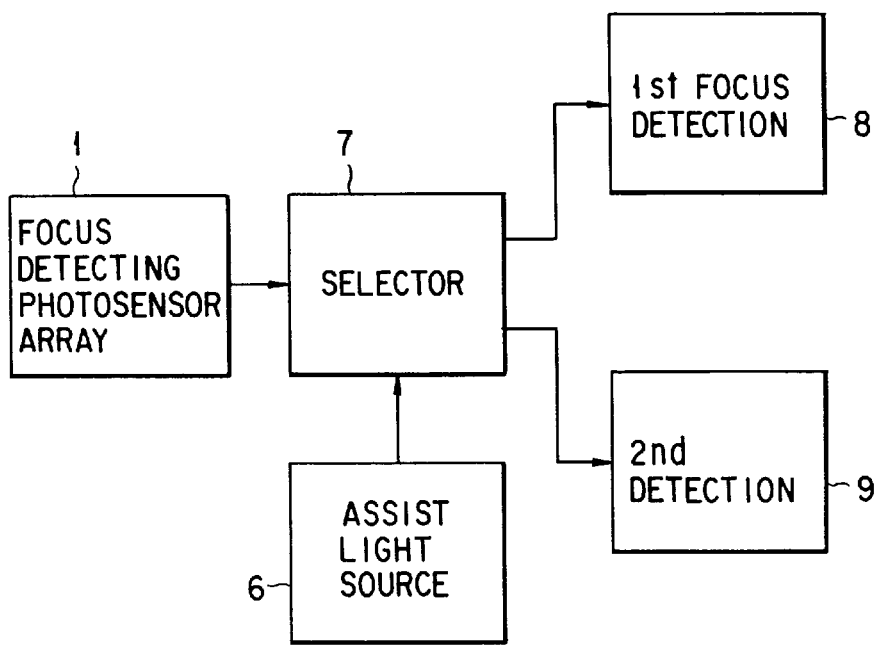
F I G. 3
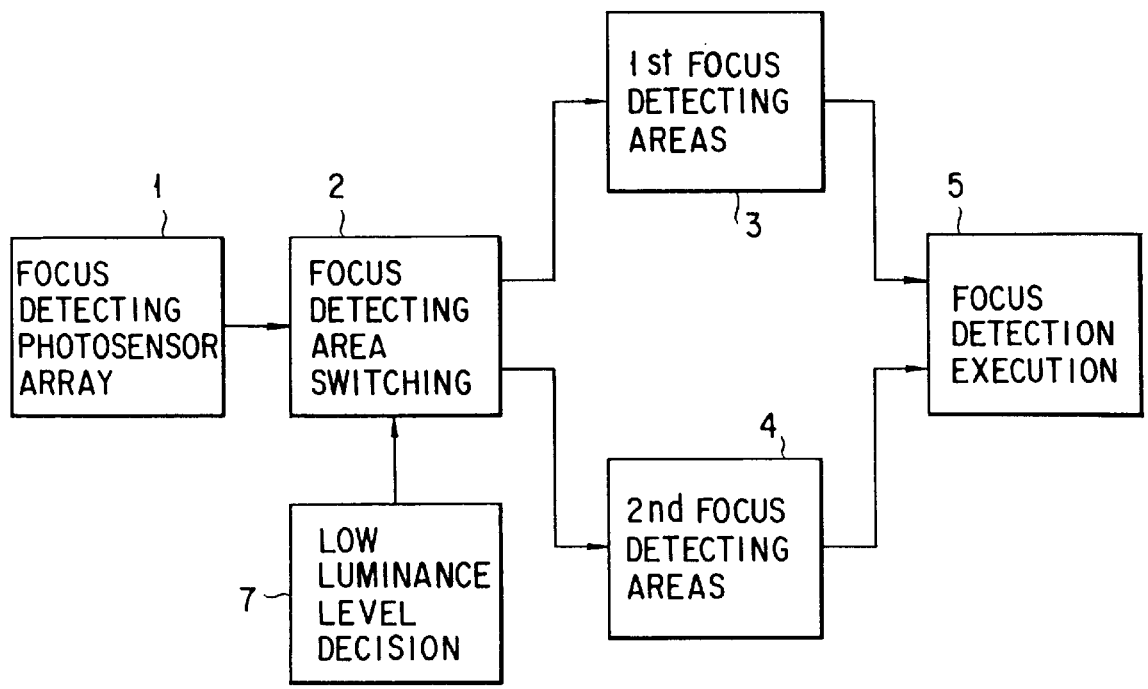
F I G. 4

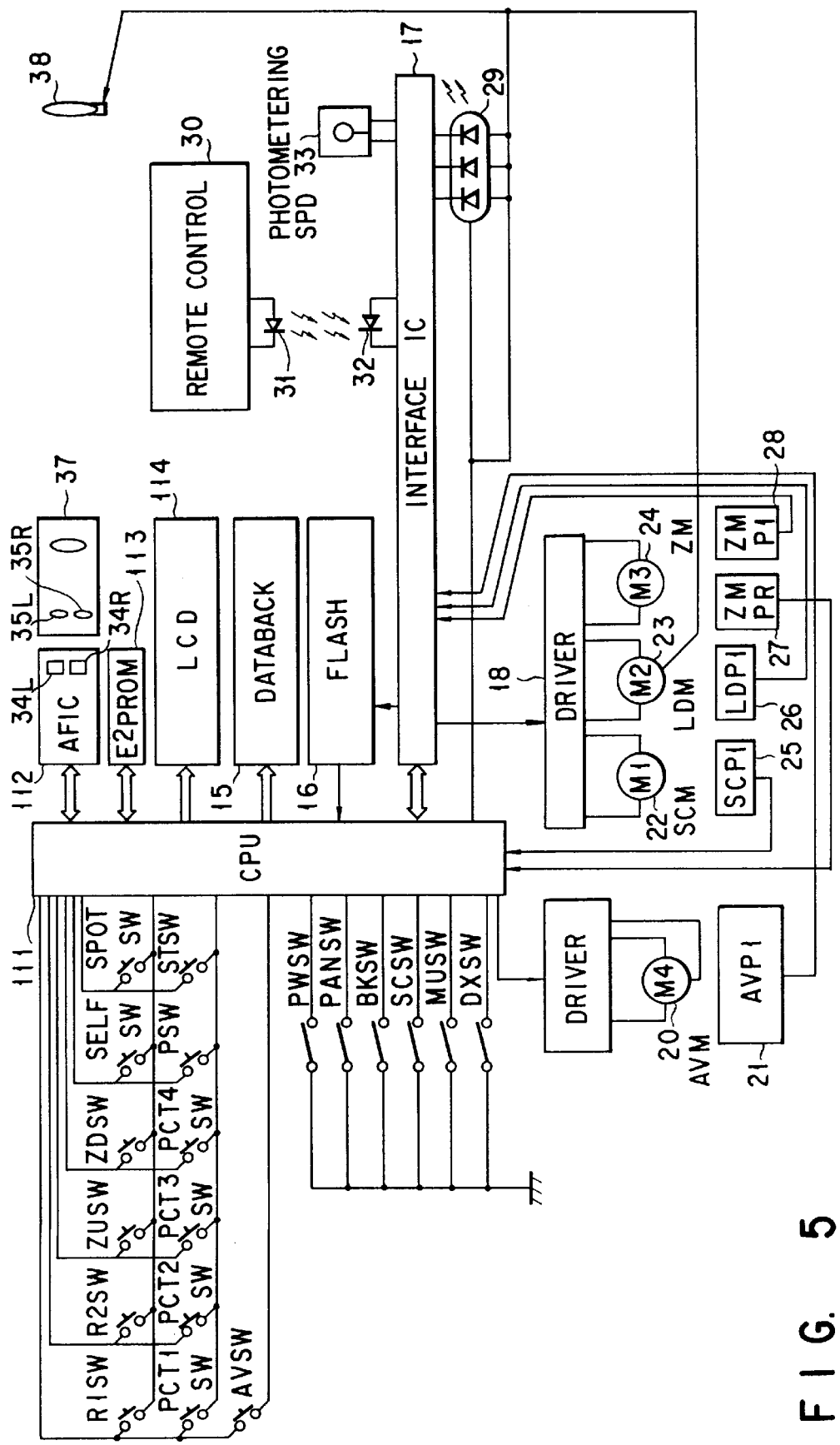
F I G. 5

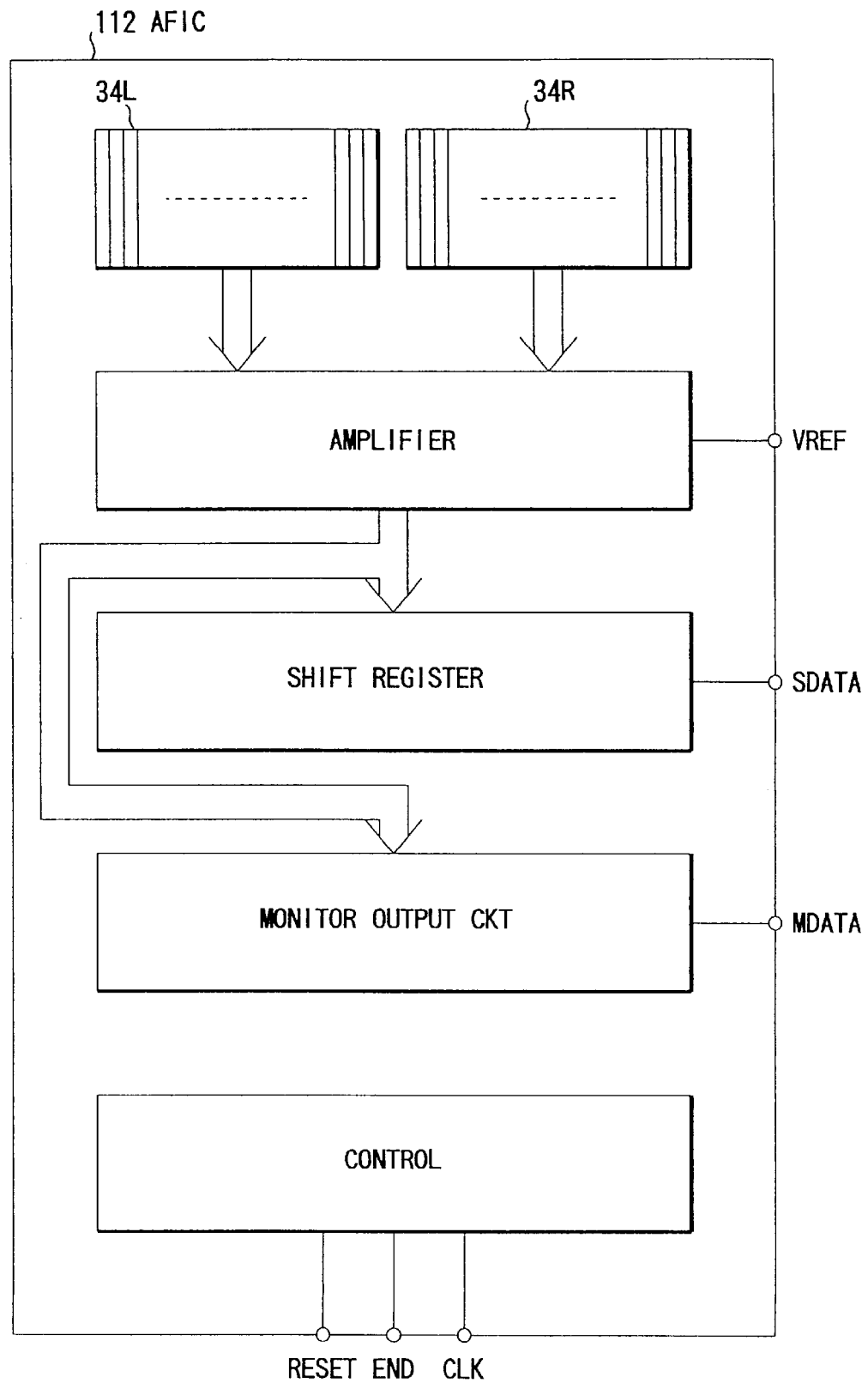
F I G. 6

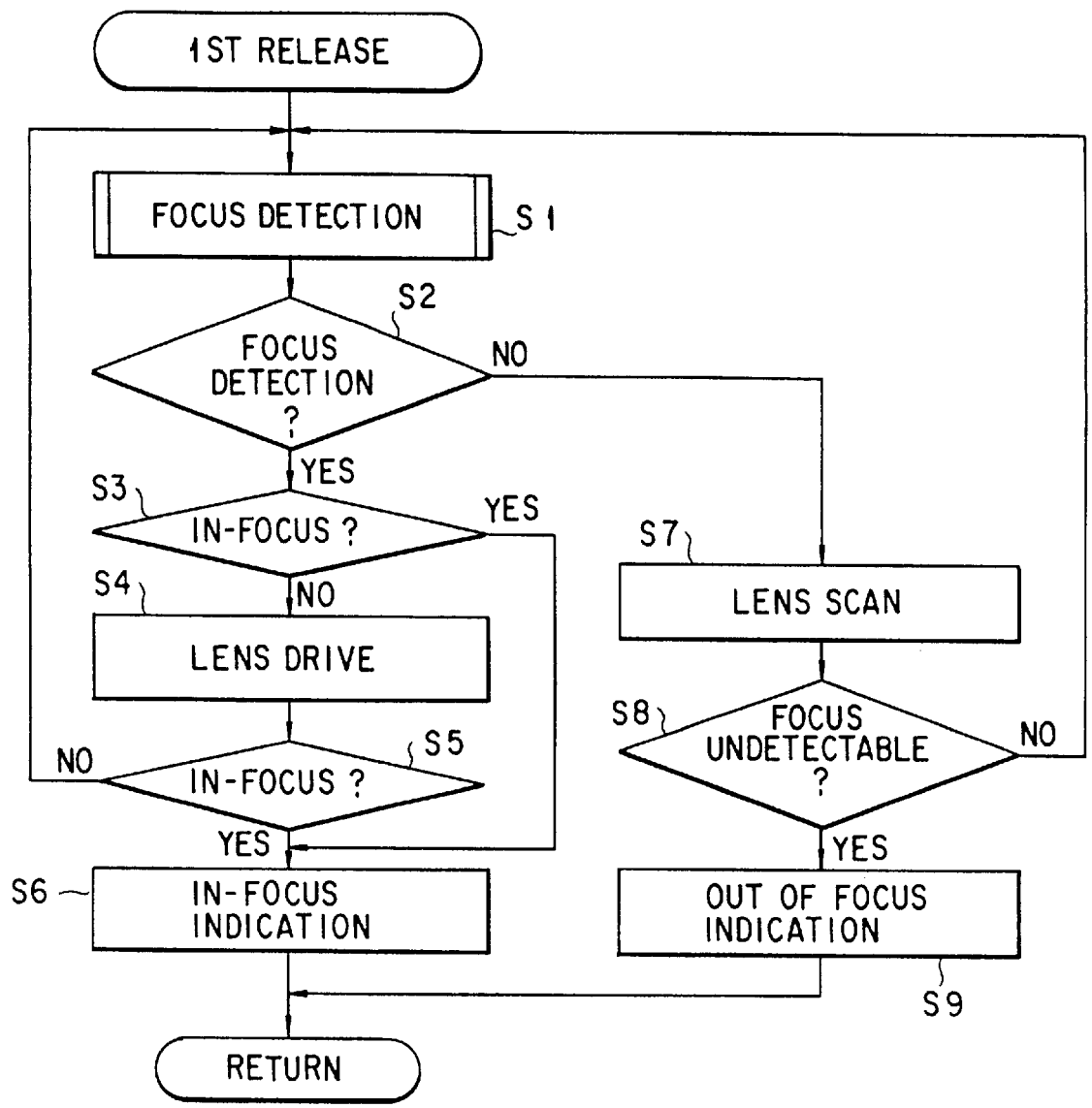
F I G. 9

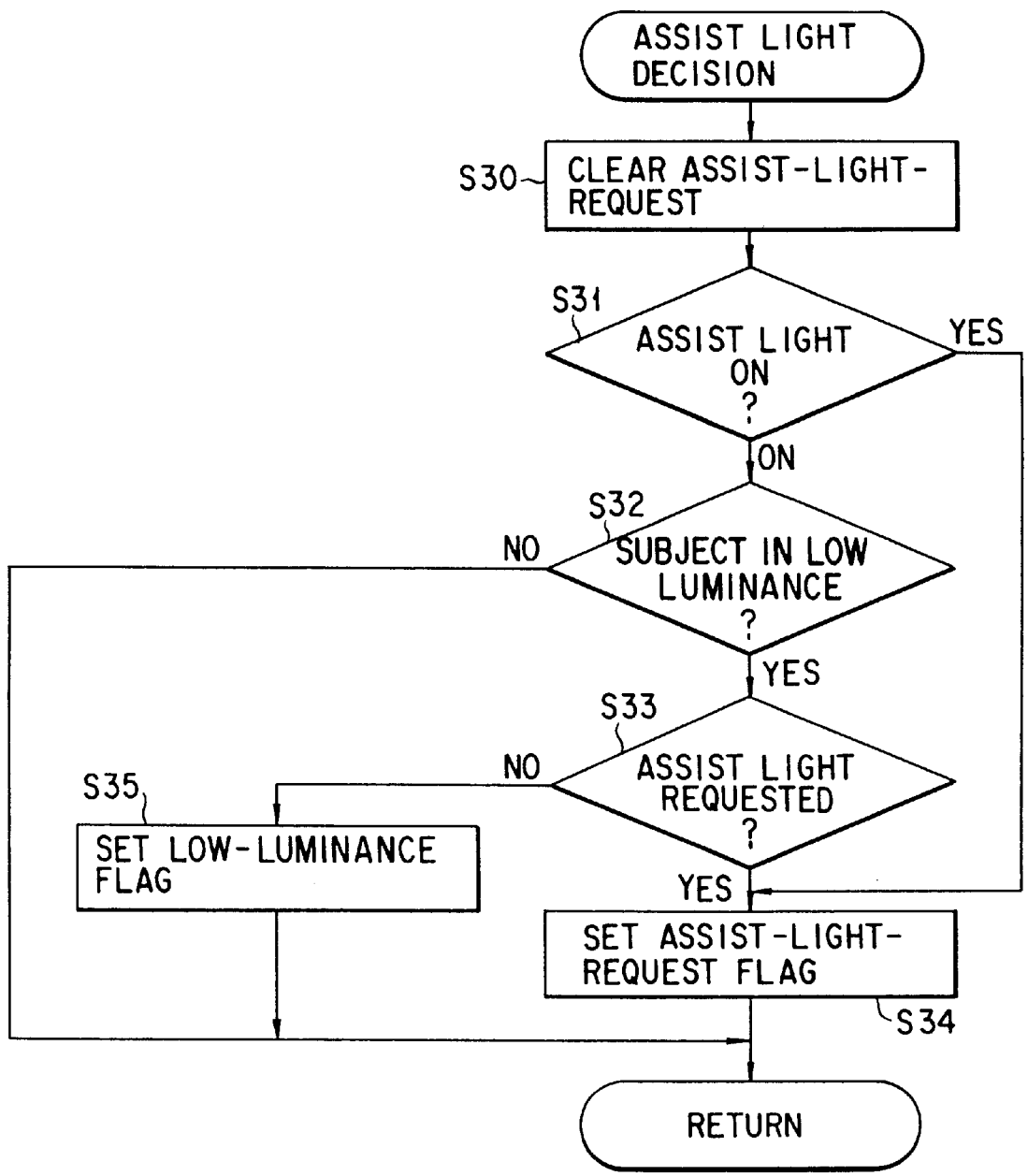
F I G. 11

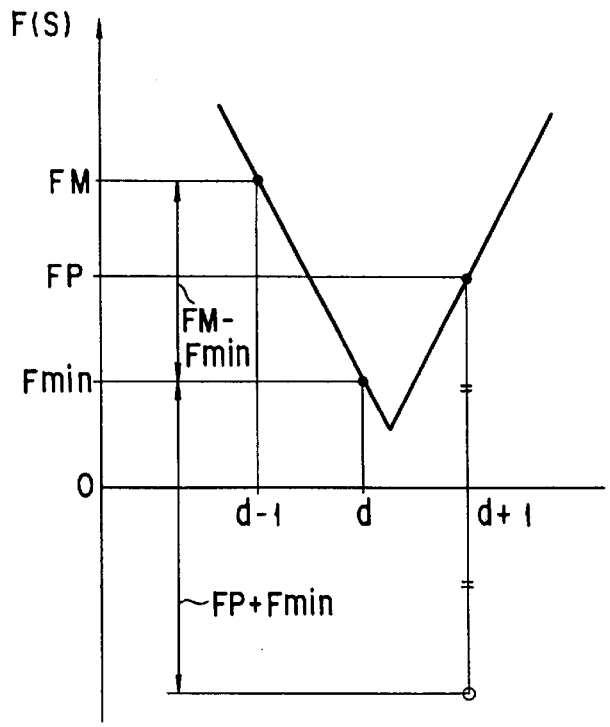
$d = (SRM + 100) - SLM$
F I G. 15

AUTOMATIC FOCUS DETECTING DEVICE

BACKGROUND OF THE INVENTION

1. Field of the Invention

The invention relates to an automatic focusing device, for use in a picture pickup device such as a camera, which detects the focus state of the objective lens by receiving light reflected back from a subject through the lens and keeps the lens in focus.

2. Description of the Related Art

Conventionally, a focus detecting technique has been developed which forms two images by reimaging beams of light reflected back from a subject that pass through first and second areas, respectively, of the objective lens which are symmetrical in position with respect to the optical axis and seeks the positional relation between the two images, thereby obtaining a displacement of a position in which the two images are formed by the objective lens from the predetermined position of its focus and the direction of the displacement, i.e., information as to whether the imaging position of the objective lens is in front of or at the rear of the predetermined focus position.

FIG. 16 shows an arrangement of the optical system in a focus detecting device based on such a conventional technique. The optical system includes a predetermined focal plane (position) 111 at the rear of an objective lens 38, a condenser lens 36 behind the plane 115, and reimaging lenses 35L and 35R behind that condenser lens. Image sensors 34L and 34R are placed on the image formation planes of the respective reimaging lenses 35L and 35R.

As indicated at 116L and 116L in FIG. 17, the images of a subject on the respective image sensors 34L and 34R draw to the optical axis 100 in the case of the so-called front focus condition in which a subject to be brought into focus is imaged in front of the predetermined focal plane 115. In the so-called rear focus condition, on the other hand, they are away from the optical axis 100. When the subject is brought into focus, the spacing between two corresponding points each of which is on a respective one of the images formed on the sensors 34L and 34R reaches a specific distance which is uniquely defined by the arrangement of the optical system in the focus detecting device, i.e., the in-focus time spacing.

In principle, therefore, the state of focus will be known by detecting the spacing between two corresponding points on the two images. The spacing between the two corresponding points can be detected by seeking correlation between two light intensity distributions on element areas of the image sensors 34L and 34R, shifting the position of the element area of one of the images sensors 34L and 34R with respect to the other, and seeking the spacing between the element areas of the image sensors for the best correlation is obtained.

With an automatic focus adjusting device having such a focus detecting optical system built in, the seeking of the shifted position for the best correlation, calculation of the spacing between the two images, calculation of the amount of defocus indicating the state of focus, calculation of the amount by which the lens is to be driven, and driving of the lens are performed under program control of microcomputer-based control means.

In addition, a focus detection related technique is disclosed in Japanese Unexamined Patent Publication No. 1-187521 which detects the state of focus of the objective lens by receiving light reflected back from a subject through the objective lens. In this technique, when the focus detection is impossible, a low contrast scan operation is performed to search for the lens location that enables the focus detection while the lens is driven. That is, according to this technique, when it is decided that the focus detection is impossible, the range over which the focus detecting operation is performed with the lens driven is limited to a narrow one, thereby reducing the time it takes to make a decision that the focus detection is impossible.

Moreover, in Japanese Unexamined Patent Publication No. 62-187829 is disclosed an automatic focus detecting technique for use in a camera in which a plurality of focus detecting areas of different sizes are set up so as to make a subject easy to pick up and the focus detecting areas are switched by a photographer on his judgment of the condition of the subject. That is, when an object is present in a scene to be shot that obstructs the focus detecting operation, a focus detecting area in the shape of a small spot is selected, while, when it is desired to shoot a moving subject, a large focus detecting area is selected, thereby improving the accuracy of focus detection.

Furthermore, a focus detecting technique is disclosed in Japanese Unexamined Patent Publication No. 63-17418, which, at first, detects focus using a small focus detecting area and, when a focus undetectable state is detected, uses a larger focus detecting area. This technique improves the accuracy of the focus detection as in shooting a moving subject by making the focus detecting area variable.

However, the conventional focus detecting techniques described above each have a range of defocus amount over which the focus is detectable which depends on the arrangement of their optical system.

The focus detectable defocus range varies according to the size of a focus detecting area on focus detecting photosensitive elements even with the same optical system used.

This will be described below.

FIG. 18 shows an example of setting up focus detecting areas on the image sensors 34L and 34R and seeking the relative position of those areas in which the best correlation between light intensity distributions on the sensors is obtained.

In the upper half of FIG. 18, a focus detecting area a1 is fixed on the image sensor 34L and a focus detecting area a2 is shifted on the image sensor 34R and correlation between light intensity distributions on the focus detecting areas a1 and a2 is taken for each shifted position. In this case, the spacing between the focus detecting areas a1 and a2 when the area a2 is shifted to the position in which the best correlation is obtained is sought. The magnitude and sign of the difference between that spacing and the in-focus time spacing indicate the amount and direction of focus displacement, respectively.

The lower half of FIG. 18 shows the case where focus detecting areas b1 and b2 which are respectively larger than the focus detecting areas a1 and a2 are set up.

In the case of the focus detecting areas a1 and a2, the focus-detectable range of defocus amount is 12a–11a. In the case of the focus detecting areas b1 and b2, the corresponding range is 12b–11b. Both the ranges are related such that $$(12b-11b) < (12a-11a)$$

It can therefore be said that the focus-detectable range of defocus amount for the focus detecting area b is smaller than that for the area a.

On the other hand, the amount of defocus of an objective (photo-taking) lens varies according to the distance between a subject and the lens over the range from the closest focusing distance to infinity. In general, the longer the focal length of an objective lens, the larger its maximum range of defocus becomes. If the defocus amount of an objective lens is larger than the focus detectable defocus range at the time of shooting, the focus detection will become impossible.

In the above-described technique disclosed in Japanese Unexamined Patent Publication No. 63-17418, at first the focus detection is performed through a small focus detecting area and, when the focus detection is impossible, a larger focus detecting area is used. As described above, when a large focus detecting area is used, the focus detectable defocus range decreases. Thus, when the defocus range of an objective lens is so large as to exceed the focus detectable defocus range for a small focus detecting area, the focus detection becomes impossible. Further, even if a large focus detecting area is used, the focus cannot be detected. A time delay involved in displaying on the viewfinder or the like that the focus detection is impossible further increases, thus making photographers feel strange. In addition, the low contrast scan operation performed when the focus detection is impossible would further increase the time delay.

Further, when a subject is in low light, a problem arises even if the low contrast operation is performed in that the focus detection is substantially impossible because the integration time required for the amount of charge stored in the image sensor to reach a level suitable for focus detection increases. When a subject is in lower light and the use of assist light is required for focus detection, the focus detection is impossible if the amount of defocus of an objective lens exceeds the focus-detectable amount of defocus with the first focus detecting areas. In this case, even if the second focus detecting areas larger than the first ones is used for focus detection, the focus detection is still impossible because the focus-detectable amount of defocus is exceeded, resulting in a useless operation and a time lag.

SUMMARY OF THE INVENTION

The object of the invention is to provide an automatic focus adjusting device which permits the time required to detect the focus to be reduced without using a low contrast scan too much even when the focus detection is impossible, permits the focus to be detected in a short time without using the low contrast scan even when a subject is in low luminance and for which the amount of defocus is large, and permits the focus to be detected even with a subject for which the amount of defocus is large when it is in low luminance and hence requires the use of assist light for focus detection.

According to an aspect of the invention there is provided an automatic focus adjusting device which detects focus information of an objective lens on the basis of two images of a subject, comprising: photosensor means having a number of pixels on which said two images are formed; focus detecting area setup means for selectively setting up either of first and second focus detecting areas on said photosensor means, said first focus detecting areas being initially set up and said second focus detecting areas being less in the number of pixels than said first focus detecting areas; operations means for performing predetermined operations on outputs of said first focus detecting areas set up on said photosensor means to provide focus information of said objective lens; evaluation means for evaluating whether the results of operations by said operations means are proper or not; and control means responsive to said evaluation means for, when the results of operations are improper, causing said focus detecting area setup means to set up said second focus detecting areas on said photosensor means and then causing said operations means to perform said operations on outputs of said second focus detecting areas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a conceptual diagram of an automatic focus adjusting device of the invention;

FIG. 2 is a conceptual diagram of an automatic focus adjusting device of the invention;

FIG. 3 is a conceptual diagram of an automatic focus adjusting device of the invention;

FIG. 4 is a conceptual diagram of an automatic focus adjusting device of the invention;

FIG. 5 shows an arrangement of a control system of a camera using an automatic focus adjusting device according to an embodiment of the invention;

FIG. 6 is a block diagram of the AFIC in FIG. 5;

FIG. 9 is a flowchart for a subroutine "fast release" carried out by the camera shown in FIG. 5;

FIG. 11 is a flowchart for the subroutine "autofocus assist light decision" shown in FIG. 9;

FIG. 15 is a graph illustrating a relation of FM, Fmin and FP;

DETAILED DESCRIPTION OF THE PREFERRED EMBODIMENTS

Figure 7:
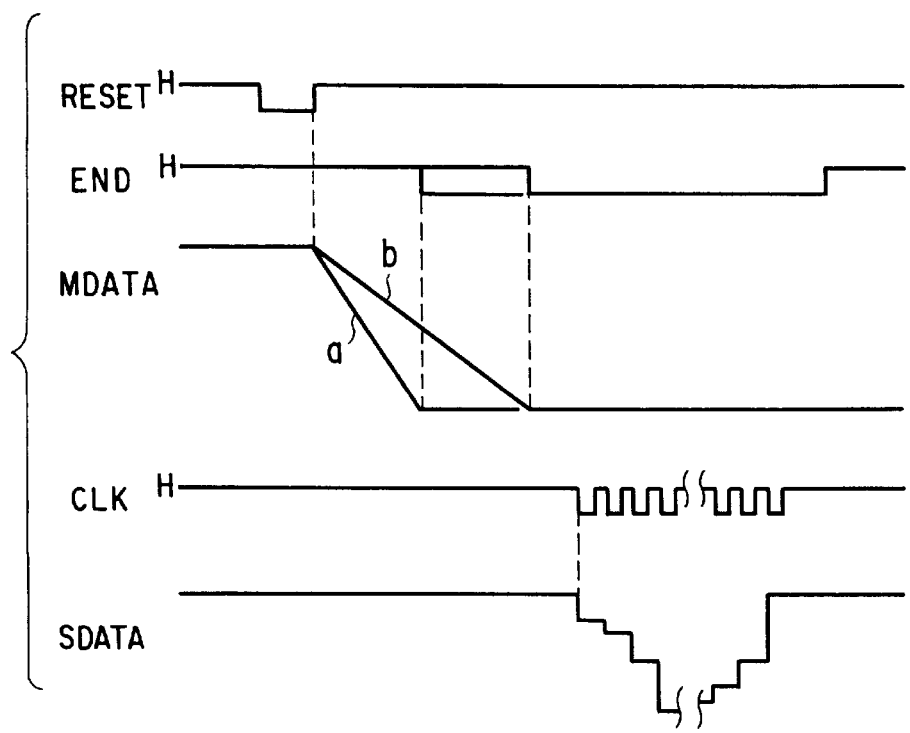
FIG. 7 shows signals at the terminals of the AFIC shown in FIG. 6.

In FIGS. 1 to 4 there are illustrated conceptual diagrams of an automatic focus adjusting device of the invention.

The automatic focus adjusting device shown in FIG. 1 is constructed from a focus detecting photosensor unit 1, a focus detecting area switching unit 2 for switching between first focus detecting areas 3 and second focus detecting areas 4 smaller than the first areas which are set up on the photosensor unit 1, and a focus detection execution unit 5 for performing focus detection on the basis of the first or second focus detecting areas selected by the switching unit 2.

In such an arrangement, first, the focus detecting area switching unit 2 sets up the first focus detecting areas 3 on the focus detecting photosensor unit 1 and the focus detection execution unit 5 performs the focus detection on the basis of the first focus detecting areas 3. If the focus detection with the first focus detecting areas 3 is impossible, then the switching unit 2 switches from the first focus detecting areas 3 to the second focus detecting areas 4 smaller than the first ones and the focus detection execution unit 5 performs the focus detection on the basis of the second focus detecting areas. The focus detection based on the second focus detecting areas 4 is larger in the detectable range of defocus than the focus detection based on the first focus detecting areas. With the second detecting areas, therefore, the focus detection becomes possible even for an objective lens for which the focus detection is impossible with the first focus detecting areas 3.

The automatic focus adjusting device shown in FIG. 2 is arranged such that an assist light source 6 is added to the arrangement of FIG. 1. When it is required to direct assist light from the light source 6 onto a subject for focus detection, the focus detecting area switching unit 2 selects the second focus detecting areas 4 larger in the detectable range of defocus than the first areas 3.

The automatic focus adjusting device shown in FIG. 3 is constructed from a focus detecting photosensor unit 1, a first focus detector 8, a second focus detector 9 which is larger than the first detector in the detectable range of defocus, a selector 7 for selecting between the first and second focus detectors 8 and 9, and an assist light source 6 for directing assist light onto a subject.

If, in such an arrangement of FIG. 3, it is required to direct assist light from the light source onto a subject for focus detection, then the selector 7 selects the second focus detector 9 having a larger detectable range of amount of defocus. The second focus detector performs focus detection on the basis of the output of the focus detecting photosensor unit 1. Thus, by using assist light, the focus detection is made possible with a subject for which the amount of defocus is large.

The automatic focus adjusting device shown in FIG. 4 is constructed from a focus detecting photosensor unit 1, a low luminance decision unit 7 for making a decision as to whether a subject is in low luminance or not, a focus detecting area switching unit 2 for switching between first and second focus detecting areas 3 and 4 which are equivalently set up on the photosensor unit 1, the second area being smaller than the first area, and a focus detection execution unit 5 for performing focus detection on the basis of the first or second focus detecting area.

If, in such an arrangement of FIG. 4, a decision by the decision unit 7 is that the subject is in low luminance, then the focus detecting area switching unit 2 selects the second area 4 and the focus detection execution unit 5 performs the focus detection on the basis of the second area.

Next, the control system of a camera using an automatic focus detecting device according to an embodiment of the invention will be described with reference to FIG. 5.

In the automatic focus adjusting device, light reflected back from a subject passes through an objective lens 38 and is then directed onto photosensor arrays 34L and 34R, i.e., image sensors, disposed on the top of an AFIC 112 through a focus detecting optical system 37 composed of a condenser lens 36 and reimaging lenses 35L and 35R.

The AFIC 112 performs a charge storage operation to be described later and sends light intensity distribution information to a CPU 111.

The CPU 111 sequentially carries out programs stored in its internal ROM and controls peripheral circuit blocks. The CPU 111 has an A/D converter built in. The CPU performs calculations for focus detection on the basis of the light intensity distribution information from the AFIC 112 and drives a focusing lens in the object lens 38 accordingly, thereby adjusting the focus.

An $E^2PROM$ 113 is a nonvolatile memory which stores correction values and adjust values for correcting mechanical variations in the camera body and variations in electrical characteristics of various elements. The CPU reads out such correction values from the ROM 113 as required and performs correction calculations to make various corrections.

A databack 15, connected to the CPU 111, imprints date on film in responsive to control signals from the CPU. Note that the amount of light from an imprinting lamp in the databack 15 is changed in steps according to film speed (ISO). An interface (IFIC) 17 makes parallel communication of 4-bit data with the CPU 111 for measurement of the luminance of a subject, measurement of the temperature inside the camera, waveshaping of output signals of a photointerrupter and the like, control of constant-voltage drive of motors, temperature stability, production of various constant voltages such as a voltage proportional to temperature, etc., battery check, reception of signals for infrared remote control, control of motor drivers 18 and 19, control of LEDs, supply voltage check, control of a booster, etc.

A silicon photodiode (SPD) 33 measures the luminance of a subject and has its light receiving surface segmented into two: center and periphery. Thus, two types of metering are provided: centerweighted spotmetering based on only the center of the SPD, and average metering using the entire surface of the SPD. The SPD 33 provides a current corresponding to the luminance of the subject to the IFIC 17, which, in turn, converts it into a voltage for transmission to the CPU 111. Upon receipt of the voltage, the CPU performs calculations for exposure and makes a backlight/nonbacklight decision.

When a voltage signal that is made to correspond to absolute temperature is output from a built-in circuit of the IFIC 17, it is converted by the A/D converter into a digital signal indicating the measured value of the temperature inside the camera. This digital signal is used as the criterion for corrections of mechanical members and electric signals which are subject to change according to temperature.

The waveshaping of the photointerrupter output signals is performed such that photocurrents output from the photointerrupter or photoreflector are compared with a reference current, then output from the IFIC 17 as rectangular currents. At this point, noise reduction is achieved by imparting a hysteresis characteristic to the reference current. It is also possible to change the reference current and the hysteresis characteristic by communication with the CPU 111.

The battery check is made on the basis of a digital value obtained by connecting a resistor of low resistance across a battery not shown, dividing a voltage across the resistor within the IFIC 17, and subjecting the resulting voltage to A/D conversion within the CPU 111. The reception of infrared remote control signals is performed by receiving an infrared light emitted modulated by an LED (light emitting diode) 31 of a remote control transmitter 30 by means of a silicon photodiode 32. The output signal of the photodiode 32 is subjected to waveshaping within the IFIC 16, then output to the CPU 111.

The supply voltage is checked such that the IFIC 17 is provided with terminals which are dedicated to the check of the supply voltage and, when the supply voltage applied to the dedicated terminals of the IFIC 17 goes lower than a specific value, a reset signal is output from the IFIC to the CPU to thereby avoid the occurrence of errors in the CPU in advance. When the supply voltage goes lower than the specific value, it is boosted by the booster.

To the IFIC 17 are connected LEDs 29 for viewfinder display for focus confirmation, flash ready, etc., and an LED used in the photointerrupter. The control of on/off of and the amount of light emitted by these LEDs is directly performed by the IFIC 17 which makes communications with the CPU 111 and the EEROM 113. The IFIC performs constant-voltage control of the motors as well.

The motor drive IC 18 drives a shutter-charge (SC) motor 22 for film advance and shutter charge, a lens driving (LD) motor 23 for focus adjustment, a zooming (ZM) motor 24, the booster circuit, and an LED for self-timer indication. The control of operations, for example, "which device is to be driven", "whether the motor is to be driven in the forward direction or the reverse direction", and "whether the brake is to be applied", is performed by the IFIC 17 controlling the motor driver IC 18 in response to the reception of signals from the CPU 111.

An SCPI 25 detects which of the shutter charging, film advancing and film rewinding states the SC motor 22 is placed in by using the photointerrupter and a clutch lever. The resulting information is sent to the CPU 111. The amount of outward movement of the lens is detected by an LDPI 26 mounted on the LD motor 23. The output of the LDPI is shaped by the IFIC 17, then sent to the CPU 111.

Further, the amount of outward movement of the lens barrel in zooming is detected by a ZMPI 28 and a ZMPR 27. When the lens barrel stays between TELE and WIDE settings, reflections from a silver seal attached to the barrel is picked up by the ZMPR 27. The output of the ZMPR is input to the CPU 111 to detect the TELE or WIDE setting position.

The ZMPI 28 is mounted on the ZM motor 24 and has its output waveshaped by the IFIC 17 and then entered into the CPU 111, thereby detecting the amount of zooming from the TELE or WIDE setting position. The motor driver IC 19 drives an AV motor (stepping motor) 20, for driving a member for adjusting the aperture in response to a control signal from the CPU 111. An AVPI 21 has its output waveshaped by the IFIC and entered into the CPU to detect the open position of the aperture.

A liquid crystal (LC) display panel 114 is responsive to signals from the CPU to display film frame counter, exposure modes, flash modes, aperture, battery condition, etc. Controlled by the IFIC 17 responsive to a control signal from the CPU 111, a flash unit 16 activates a flash tube to emit light when the luminance of the subject is insufficient at the time of shooting or autofocusing.

A fast release switch R1SW is turned on when the shutter release button is half depressed, whereby an autofocusing operation is performed. A second release switch R2SW is turned on when the release button is fully depressed, whereby a shooting operation based on various measured values is performed. A zoom-up switch ZUSW and a zoom-down switch ZDSW are switches adapted to move the lens barrel. When the switch ZUSW is turned on, the lens barrel is moved in the direction of long focal lengths, while, when the switch ZDSW is turned on, the lens barrel is moved in the direction of wide-angle focal lengths. When a self-timer switch SELFSW is turned on, the camera is placed in the self-timer shooting mode or the wait state for remote control operation. When, in this state, the switch R2SW is turned on, the self-timer-based shooting is performed. On the other hand, when a shooting operation is performed on the remote control transmitter 30, the remote-control-based shooting is performed.

When a spot switch SPOTSW is turned on, the spotmetering mode is set in which metering is performed using only a portion of the center of the shooting frame. This is metering by an AF sensor to be described later. The normal metering with the SPOTSW turned off is evaluative metering by the metering SPD 33. Switches PCT1SW to PCT4S and a program switch PSW are changeover switches for program modes and are selected by a photographer to suit shooting conditions. When the PCT1SW is turned on, a portrait mode is set in which the aperture and shutter speed are determined within a proper exposure range so that limited depth of field will be provided.

When the switch PCT2SW is turned on, a night scene mode is set in which exposures are set one stop under proper exposures in normal shooting situations. When the switch PCT3SW is turned on, a scenic mode is set in which the aperture and shutter speed are determined within a proper exposure range so that as great a depth of field as possible will be provided. Further, when the switch PCT4SW is turned on, a macro mode is set for close-distance shooting. The switches PCT1SW to PCT4SW can be selected two or more at a time.

The switch PSW is a program mode changeover switch which, when pressed, resets the switches PCT1SW to PCT4SW and an AV (Aperture Value)-priority program mode to be described later. When an AV-priority switch AVSW is turned on, the shooting mode is switched to the AV-priority program mode. In this mode, a photographer sets an AV value and the camera sets the proper-exposure, program-selected shutter speed. The switches PCT2SW and PCT4SW loses their functions described above and serve as AV-value setting switches. More specifically, the switch PCT2SW is adapted to make the AV large, while PCT4SW is adapted to make the AV small.

A flash switch STSW swichtes flash modes including an autoflash mode (AUTO), a red-eye reduction autoflash mode (AUTO-S), a forced flash mode (FILL-IN), and a flash-off mode (OFF). A panorama switch PANSW is adapted to detect whether the shooting mode is the panorama mode or the normal mode and is turned on in the panorama mode. In the panorama mode, calculations are performed for exposure compensation. This is because, in the panorama mode, the top and bottom of film frames are masked and a portion of the light sensor is masked accordingly, failing to achieve accurate metering.

A back-cover switch BKSW detects the state of the back cover of the camera and is in the off position when the back cover is closed. When the switch BKSW makes a transition from on to off state, the film loading is started. A shutter charge switch SCSW detects the shutter being charged. A mirror-up switch MUSW is adapted to detect the mirror-up state and turned on when the mirror is raised. A DX switch DXSW, which, though not shown, is actually composed of five switches, is adapted to read the film-speed indicating DX code printed on the film cartridge and detect whether film is loaded or not.

The flash unit 16 charges the built-in capacitor in response to a signal from the CPU 111. The CPU detects the voltage across the capacitor through its divided output and stops the charging of the capacitor when its voltage reaches a predetermined level. Upon receipt of a flash signal from the CPU through the IFIC, the flash unit is fired to emit a burst of light. In the present embodiment, the flash unit 16 is used as a source of autofocus assist light.

Next, an arrangement of the IFIC 12 will be described with reference to FIG. 6.

Charges produced by light incident on arrays 34L and 34R of photosensors are stored on capacitors inside an amplifier AP and amplified, the capacitors having a one-to-one correspondence with the photosensors. Each pixel signal amplified in the amplifier AP is converted by a monitor output circuit MO to a signal corresponding to the peak value (maximum value) of all pixels and then output to the A/D converter in the CPU 111 via a terminal MDA.

On the other hand, each pixel signal from the amplifier AP is output in sequence by a shift register SR from a terminal SDATA in synchronism with a clock signal output from the CPU to a terminal CLK. The signal is applied to the AD converter in the CPU. A control circuit CNT controls the operation of each circuit block in the AFIC 112 in response to control signals RESET, END and CLK from the CPU 111. The amplifier AP is supplied with a reference voltage VREF from the IFIC 17.

At this point, signals at the terminals of the IFIC shown in FIG. 6 will be described with reference to FIG. 7.

When a RESET signal at a low level is output from the CPU 111, each circuit block in the IFIC 112 is initialized. When the RESET signal goes high, the storage operation is started. As described above, the pixel output corresponding to the peak level of each pixel is output at the terminal MDATA.

In FIG. 7, a and b each indicate the amount of incident light and a is larger than b. After the start of storage operation, the CPU 111 converts the MDATA signal into digital form to monitor the storage level. At the time the proper storage level is reached, the CPU 111 causes the END signal to go from the high level to the low level, thereby stopping the storage operation. An amount of time during which the charge storage is performed, i.e., the interval between the time at which the RESET signal goes from the low level to the high level and the time at which the END signal goes from the high level to the low level is counted by an internal counter and then stored as an integration time.

As shown at MDATA in FIG. 7, the integration time varies with the amount of incident light. On the basis of the integration time, the CPU 111 determines the luminance of a subject. Next, the CPU provides to the terminal CLK a clock signal for reading the pixel signals. The pixel signals are output in sequence to the terminal SDATA in synchronism with the clock signal. In the CPU, the pixel signals are converted into digital form and stored in its internal RAM as pixel data.

Figure 8:
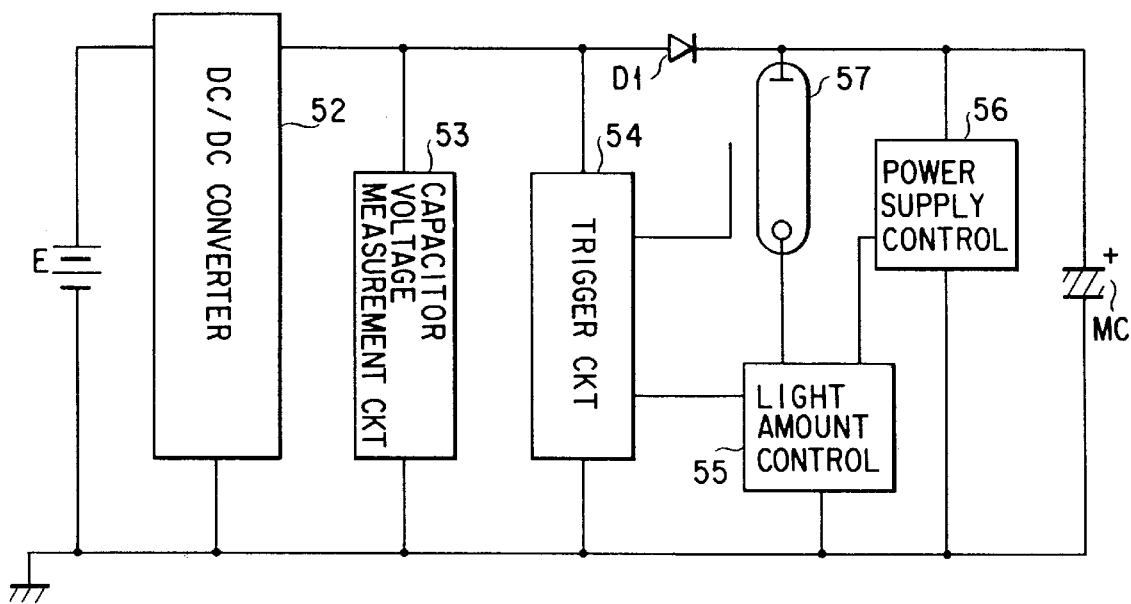
FIG. 8 shows an arrangement of the flash shown in FIG. 5.

Next, an arrangement of the flash unit 16 will be described with reference to FIG. 8.

In parallel with a power supply E is connected a DC/DC converter 52 which converts the supply voltage to a voltage that allows the flash unit to emit light. To the output of the DC/DC converter is connected a main capacitor voltage measuring circuit 53 which measures the voltage across the main capacitor MC. To the output of the converter are also connected a trigger circuit 54 which triggers an Xe (xenon) tube 57 to emit light. Further, the main capacitor MC which stores light emitting energy is also connected to the converter output through a diode D1. To the cathode of the diode are connected in series the Xe tube 57 which dissipates the energy in the main capacitor MC to emit light and a control circuit 55 which controls the amount of light emitted by the Xe tube. A power supply control circuit 56 supplies the boosted voltage to the light emission control circuit 55. The control of the DC/DC converter 52, the main capacitor voltage measuring circuit 53, the trigger circuit 54, the light emission control circuit 55 and the power supply control circuit 56 is performed by the CPU 111 with the IFIC 17 used as interface.

Next, reference will be made to a flowchart illustrated in FIG. 9 to describe the fast release procedure carried out by the camera of the invention.

First, the CPU 111 carries out the subroutine "focus detection" to be described later (step S1) and makes a decision of whether the result of focus detection indicates undetectability by making reference to a flag indicating whether the focus is detectable or not (step S2). When the decision is that the focus is detectable, reference is made to an in-focus flag to make an in-focus/out-of-focus decision (step S3). When the decision is in-focus, the CPU 111 provides in-focus indication with an LED within the viewfinder or with a beep (step S6) and then returns to a general photographing sequence.

If, on the other hand, the decision in step S3 is out-of-focus, then the CPU carries out the subroutine "lens drive" to move the focusing lens on the basis of the result of focus detection (step S4). In the subroutine "lens drive", when the amount of lens drive is smaller than a predetermined value, a subject is considered to be in focus and the in-focus flag is set without confirmation of whether the subject has been brought into focus by detecting the focus again. Next, the CPU 111 makes a decision of whether the subject is in focus or not by making reference to the in-focus flag (step S5). If the decision is in-focus, the in-focus indication is provided as described previously (step S6); otherwise, the procedure returns to step S1 to perform the subroutine "focus detection" again.

If, in step S2, the focus is undetectable, then the CPU 111 makes a lens scan to search for the lens location where the focus is detectable (step S7). If the lens location where the focus is detectable is not found as a result of the lens scan, then the CPU 111 provides out-of-focus indication with the LED within the viewfinder (step S9) and then returns to the general photographing sequence.

If, on the other hand, the lens location where the focus is detectable is detected in step S8, then the procedure returns to step S1, so that the CPU detects the focus again at that lens location.

Figure 10:
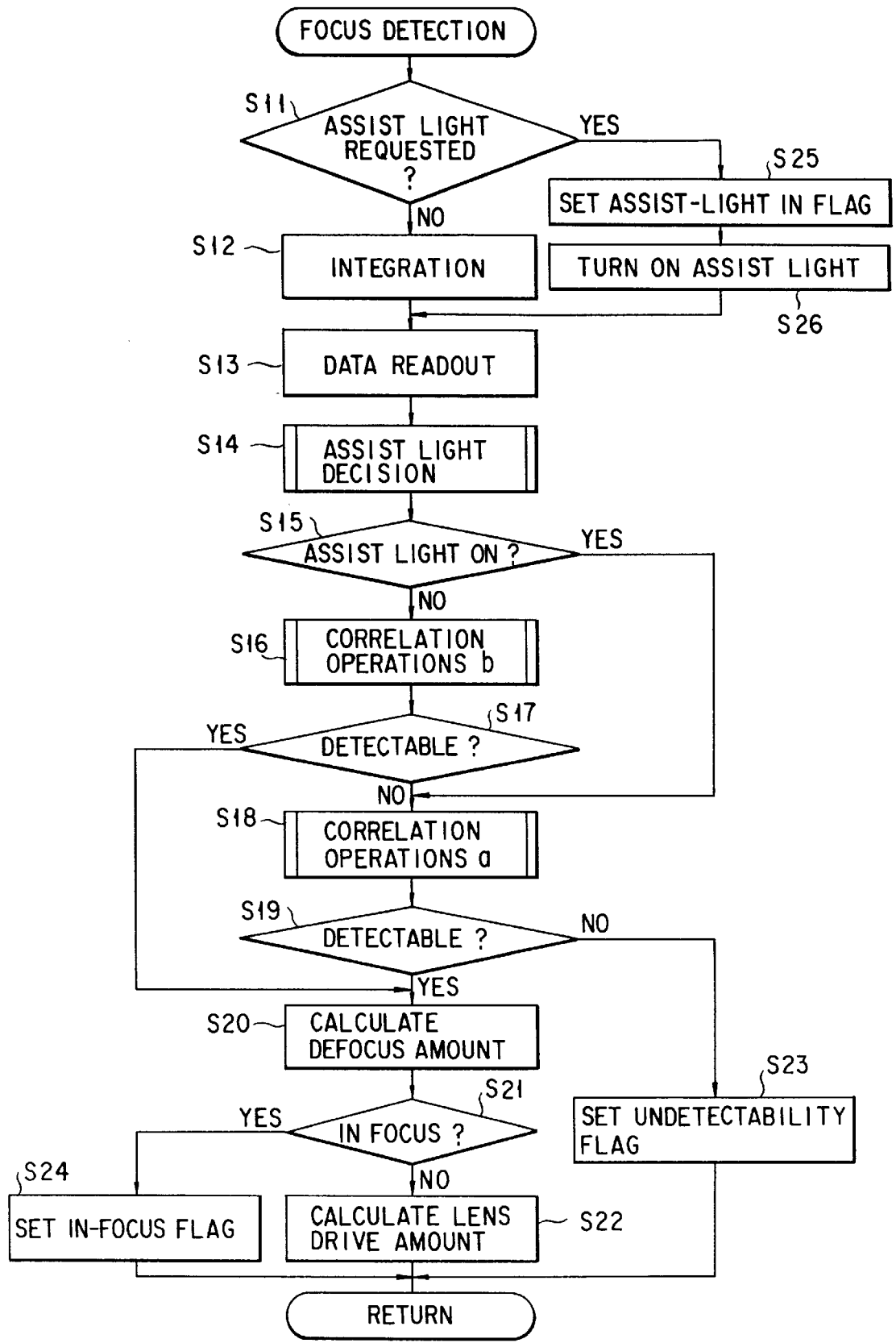
FIG. 10 is a flowchart for the subroutine "focus detection" shown in FIG. 9.

The subroutine "focus detection" in step S1 in the flowchart of FIG. 9 is carried out in accordance with the procedure shown in FIG. 10.

First, reference is made to an assist-light request flag that is set in the subroutine "assist light decision" (step S14) to make a decision of whether a subject is in such a luminance as requires assist light (step S11). If that flag has been set, then the CPU 111 sets an assist-light-on flag (step S25) and then performs integration while irradiating the subject with the assist light (step S26), performs data readout (step S13), and performs the subroutine "assist light decision" (step S14).

On the other hand, when a request for assist light is not made in step S11, the CPU 111 causes the AFIC 112 to perform normal integration (step S12). At this point, the CPU counts the integration time in the AFIC by using its internal counter. Next, the CPU provides clock pulses to the AFIC 112 to read pixel data representing light intensity distribution and converts the pixel data read in sequence from the AFIC into digital form by the A/D converter and then stores it into its internal RAM (step S13).

Next, the subroutine "assist light decision" is carried out (step S14), whereby a decision is made as to whether the subject is in such a luminance as requires assist light and the assist-light-request flag is set if necessary.

That is, as shown in FIG. 11, in the subroutine "assist light decision", the CPU 111 clears the assist-light-request flag (step S30), make reference to the assist-light-on flag set in step S24 in FIG. 10 to make a decision of whether this integration has been performed under the condition that the assist light is on (step S31), sets the assist-light-request flag when the assist light is on (step S34), and returns the procedure to step S15.

On the other hand, if the decision in step S31 is that the assist light is off, then the CPU 111 makes a comparison between the integration time in the AFIC and a first predetermined time in order to make a decision of whether the subject is at a low light level at which the effect of the lens scan is small or at such a lower luminance as requires assist light. When the integration time is shorter than the first predetermined time, the decision is that the subject is not at a low luminance. In such a case, the CPU returns the procedure to step S15. If the integration time is longer than or equal to the first predetermined time, then the integration time is compared with a second predetermined time longer than the first time (S33). If the integration time is shorter than the second time, then the assist light is unnecessary. In this case, a low-luminance flag is set in step S35 and the procedure returns to step S15 of FIG. 10. If, on the other hand, the integration time is not shorter than the second time, the assist-light-request flag is set and the procedure returns to step S15.

In step S15 of FIG. 10, reference is made to the assist-light-on flag to select between the focus detecting areas. If the assist light is off, then a subroutine "correlation operations b" to be described later is carried out, whereby the correlation based on the larger focus detecting area b is sought (step s16). If the focus is detectable, the procedure goes to step S20.

On the other hand, if the decision in step S15 is that the assist light is off and if the decision in step S17 is that the focus is undetectable, then the CPU 111 carries out a subroutine "correlation operations a", whereby correlation based on the smaller focus detecting area a is sought (step S18). Subsequent to the subroutine "correlation operations a", a decision is made as to whether the focus is detectable or not (step S19). If the focus is detectable, then the amount of defocus of the lens is calculated on the basis of the result of the focus detection (step S20).

If, on the other hand, the decision in step S19 is that the focus is undetectable, then the CPU sets the undetectability flag (step S23) and returns the procedure to step S2 in FIG. 9. The amount of defocus of the lens calculated in step S20 is compared with an in-focus threshold to decide if the subject is in focus or not (step S21). If the subject is in focus, then the in-focus flag is set (step S24); otherwise, the amount of drive of the lens is calculated on the basis of the amount of defocus of the lens (step S22). The procedure then returns to step S2 in FIG. 9.

Figure 12:
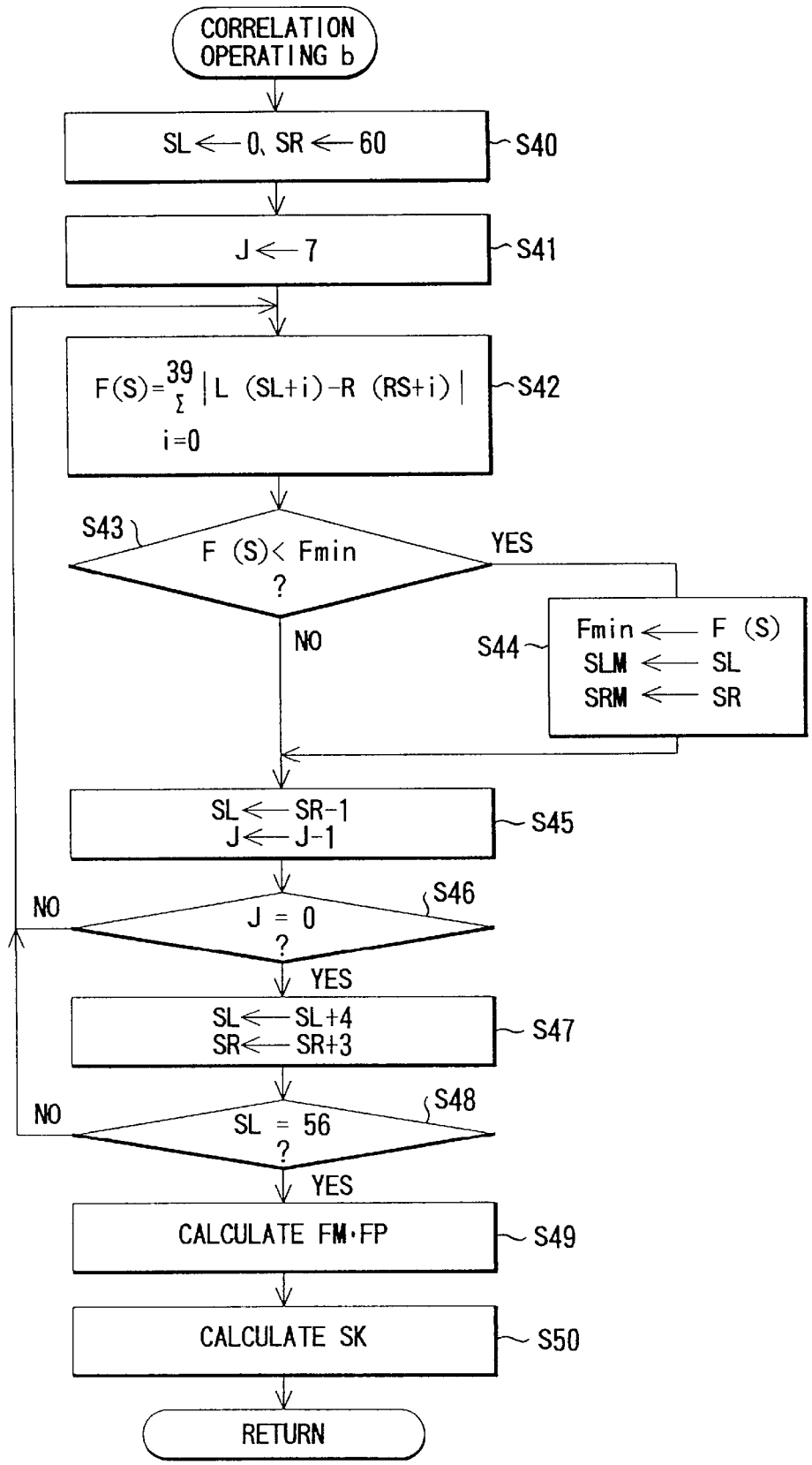
FIG. 12 is a flowchart for the subroutine "correlation operation b" shown in FIG. 9.

Next, reference is made to FIG. 12 to describe the operation of the subroutine "correlation operations b" in step S16 of FIG. 10.

In this subroutine, correlation operations are performed on two images of a subject to detect the spacing therebetween. Let the subject images on the photodiode arrays 34L and 34R be represented by L and R images, respectively, and pixel signals indicating light intensity distributions on the L and R images on the photodiode arrays 34L and 34R be represented by L(i) and R(i), respectively. Here, i represents the pixel number and takes 0, 1, 2, . . . , 99 in the order of arrangement in this embodiment. That is, the photodiode arrays 34L and 34R each have 100 pixels.

First, variables SL, SR and J are set to 0, 60, and 7, respectively (steps S40, S41). The SL is a variable to store the number of the first pixel of a pixel array (block) which is used for correlation operations in the subject image signal L(i). The SR is a variable to store the number of the first pixel of a block pixel string on which correlation operations are to be performed in the subject image signal R(i). The variable J is one to count the number of times the block is shifted in the subject image signal R(i). The correlation F(S) between the block pixel strings is calculated in step S42 by $$F(S) = \sum_{i=0}^{39} |L(SL+i) - R(SR+i)| \qquad (1)$$

In this case, the number of pixels in each block is 40.

Subsequently, a comparison is made between F(S) and Fmin to detect the minimum value of the correlation F(S). If F(S)<Fmin, then F(S) is substituted for Fmin and SL and SR are stored as SLM and SRM, respectively (steps S43 and S44). Further, SR and J are each decremented by one (step S45).

If J is not 0 in step S46, the procedure returns to step S42 to repeat the correlation operations. That is, in this example, the correlation is taken while the block location in the subject image R(i) is shifted pixel by pixel with the block location in the subject image L(i) fixed (steps S42 to S45).

When J reaches 0 in step S46, 4 is added to SL and 3 is added to SR (step S47). Until SL reaches 56, the correlation operations are repeated (step S48). That is, the block location in the subject image L(i) is set shifted by four pixels. And when SL reaches 56 in step S48, the shifting of the block location for the correlation detection is terminated.

Figure 14B:
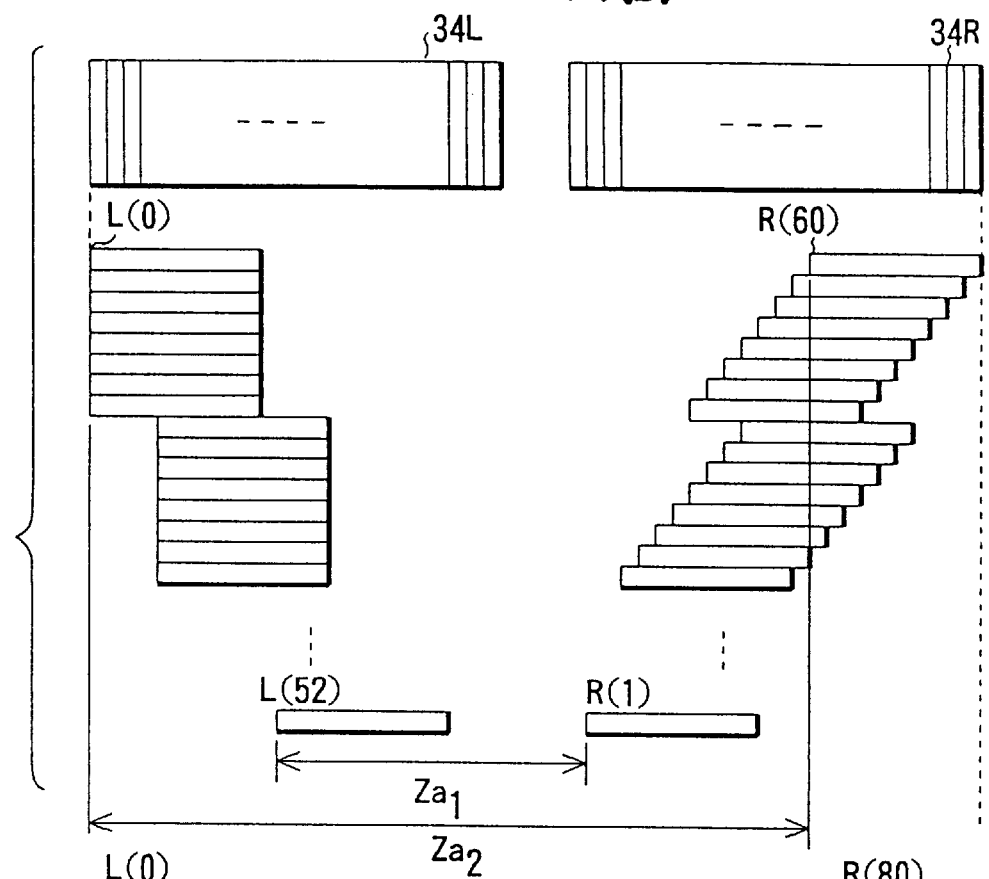
FIGS. 14($a$) and 14($b$) schematically show changes in position of blocks (area) of image sensors on which correlation between subject images L(i) and R(i) is taken in the procedure of FIG. 12.
Figure 14A:
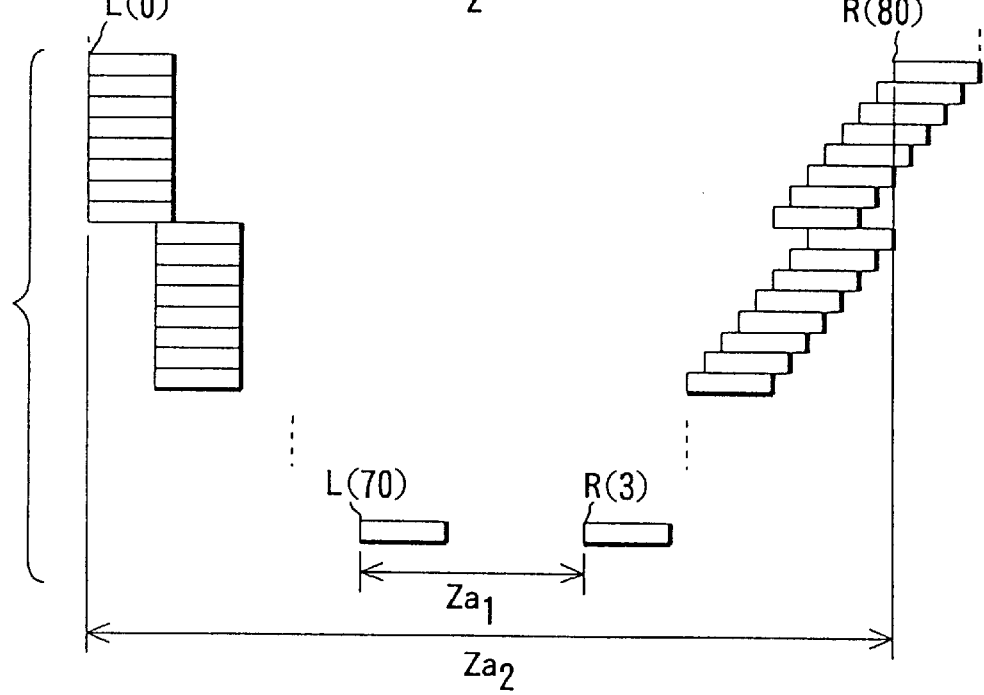
Figure 16:
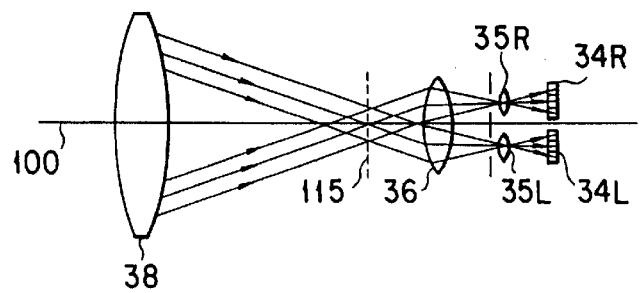
FIG. 16 shows an arrangement of the optical system of a conventional automatic focus adjusting device.
Figure 17:
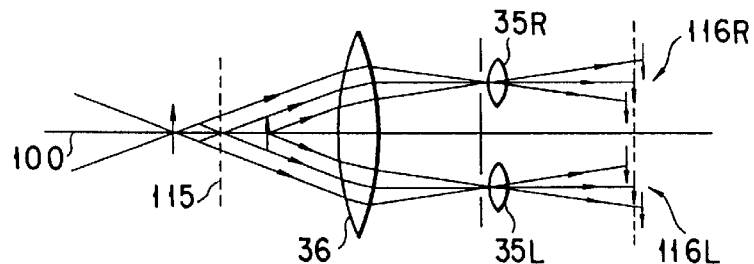
FIG. 17 shows an arrangement of the optical system of a conventional automatic focus adjusting device.
Figure 18:
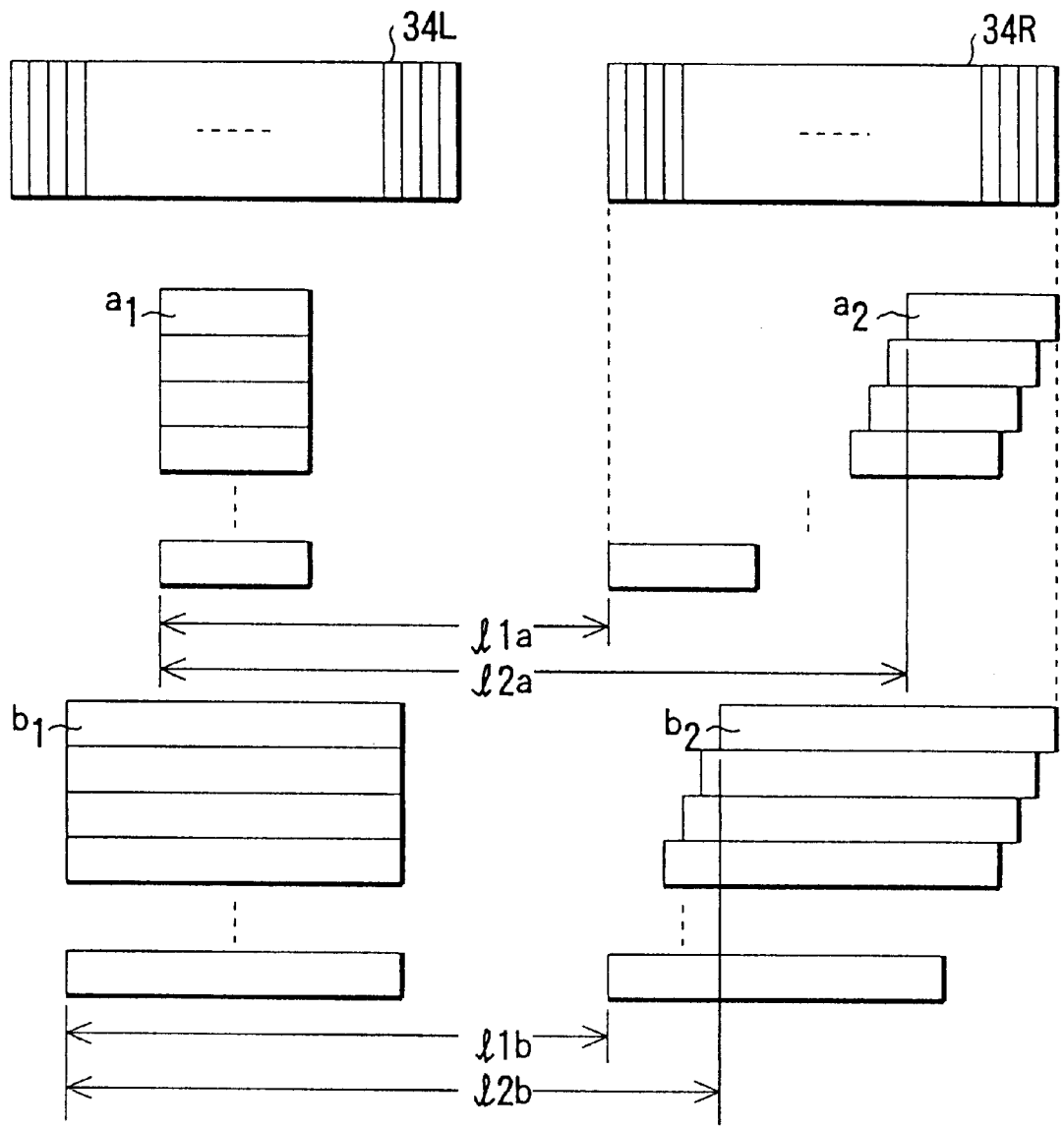
FIG. 18 is a diagram illustrating an operation of setting up focus detecting areas on the image sensors of FIGS. 16 and 17 and detecting the relative position of the detecting areas for the best correlation between light intensity distributions on the detecting areas.

By the above operations, the correlation can be detected in an efficient manner to obtain the minimum value of the correlation. The block locations SLM and SRM at which the correlation output indicates the minimum value indicate the locations of the subject images that are most highly correlated. In FIGS. 14(a) and 14(b), there is schematically shown changes in the locations of the subject image blocks L(i) and R(i) adapted for correlation detection. However, the block locations in FIGS. 14(a) and 14(b) do not coincide exactly with those described in connection with the flowchart of FIG. 12 for the convenience of illustration.

In order to determine the reliability of block image signals thus calculated to be most highly correlated, FM and FP are calculated in step S49 by $$FM = \sum_{i=0}^{39} |L(SLM + i) - R(SLM + i - 1)| \quad (2)$$

$$FP = \sum_{i=0}^{39} |L(SLM + i) - R(SLM + i + l)| \quad (3)$$

That is, the correlation between that block of the subject image R(i) which is shifted by ±1 pixel with respect to its most highly correlated block and the most highly correlated block of the subject image L(i) is calculated. In this case, FM, Fmin and FP are related as shown in FIG. 15. In FIG. 15, the ordinate represents the correlation output and the abscissa represents the difference in location between subject image blocks L(i) and R(i) for which correlation is taken.

Subsequently, in order to determine the reliability of the correlation, the reliability index SK is calculated in step S50 as follows:

when FM≧FP, $$SK = \frac{FP + F\min}{FP - F\min} \quad (4)$$

or, when FM<FP, $$SK = \frac{FM + F\min}{FP - F\min} \quad (5)$$

When the reliability is high, SK=1; otherwise, SK>1. Using the reliability index SK, a decision is made as to whether the calculated correlation is reliable, i.e., whether the focus is detectable or not.

Figure 13:
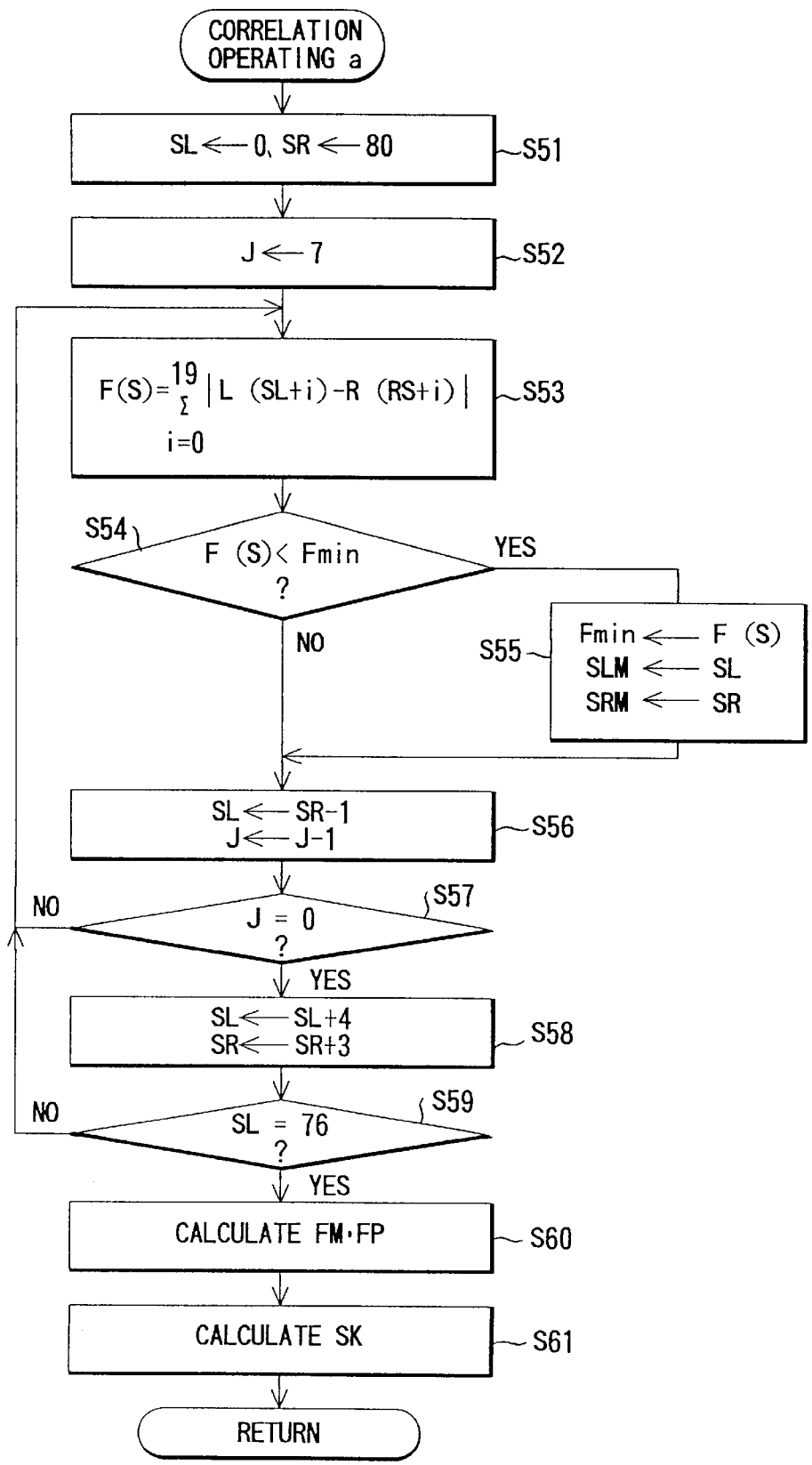
FIG. 13 is a flowchart for the subroutine "correlation operation a" shown in FIG. 9.

Next, reference will be made to FIG. 13 to describe the subroutine "correlation operations a". Here, only steps that are distinct from the steps in FIG. 12 will be described. First, the variables SL, SR and J are set to 0, 80, and 7, respectively (steps S51 and S52). The correlation output F(S) is calculated in step S53 by $$F(S) = \sum_{i=0}^{19} |L(SL + i) - R(SR + i)| \quad (6)$$

In this case, the number of pixels in a block is set to 20.

The subsequent steps from step S54 to step S58 are exactly identical to the corresponding steps in the subroutine "correlation operations a" in FIG. 12. The correlation operations are repeated until SL becomes equal to 76 in step S59. In the lower portion of FIG. 14, there is schematically illustrated changes in the location of blocks for the correlation operations a. In this figure, the range of image displacement corresponding to the detectable range of defocus is (Zb2−Zb1) for the correlation operations b and (Za2−Za1) for the correlation operations a. The detectable range of defocus in the correlation operations a is larger than in the correlation operations b.

As with the correlation operations b, FM, FP and SK are calculated in steps S60 and S61 and the procedure returns to step S19 in FIG. 10.

The detectable range of image displacement in the present embodiment is as follows:

with the correlation operations a, $$Z_{a2} - Z_{a1} = (R(80) - L(0)) - (R(3) - L(72))$$
$$= (80 - 0) - (3 - 72) = 149 \, (\text{pixels})$$

and, with the correlation operations b, $$Z_{b2} - Z_{b1} = (R(60) - L(0)) - (R(1) - L(52))$$
$$= (60 - 0) - (1 - 52) = 111 \, (\text{pixels})$$

As described above, the present invention performs a focus detect operation using the correlation operations a greater in the detectable range of defocus than the correlation operations b when the focus detection is impossible with the latter, making the focus detection possible even with subjects for which the amount of defocus is large.

Moreover, when a subject is in low luminance, the focus is detected with the correlation operations a having a greater detectable range of defocus, making the focus detection possible even with subjects for which the amount of defocus is large.

Furthermore, when a subject is irradiated with assist light for focus detection, the focus detection is performed with the correlation operations a, making the focus detection possible even with subjects for which the amount of defocus is large.

According to the present invention, therefore, an automatic focus adjusting device can be provided which can reduce the time required to detect the focus without using a low contrast scan too much even when the focus detection is impossible, allows the focus detection even with subjects which are in low luminance and for which the amount of defocus is large, and allows the focus detection even with subjects for which the amount of defocus is large when they are in low luminance and require to be irradiated with assist light for focus detection.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic focus adjusting device which forms two images of a subject and measures one of a focus state of an objective lens and a distance to the subject based on light intensity distributions of said two images of the subject, said automatic focus adjusting device comprising:

a photosensor array on which said two images of the subject are formed;

first focus detecting areas including a pair of first block pixel strings set up on said photosensor array;

second focus detecting areas including a pair of second block pixel strings set up on said photosensor array, said second focus detecting areas being smaller than said first focus detecting areas;

focus detecting area switching means for switching between said first and second focus detecting areas; and focus detection means for performing focus detection based on one of said first and second focus detecting areas, said focus detecting means executing an operation whereby a position of one of each of the pair of the first and second block pixel strings is shifted a predetermined number of times while the other one of the pair of the first and second block pixel strings is held at more than one of a plurality of fixed positions;

wherein said focus area switching means switches from said larger first focus detecting areas to said smaller second focus detecting areas for focus detection when said focus detection means cannot perform focus detection based on said first focus detecting areas.

2. An automatic focus adjusting device which forms two images of a subject and measures one of a focus state of an objective lens and a distance to the subject based on relative displacement of said two images of the subject, said automatic focus adjusting device comprising:

a photosensor having a plurality of pixel arrays on which said two images of the subject are formed;

first focus detecting areas including a pair of first block pixel strings set up on said photosensor, said first focus detecting areas having a first predetermined defocus detecting range over which a first amount of defocus is detected;

second focus detecting areas including a pair of second block pixel strings set up on said photosensor, said second focus detecting areas having a second predetermined defocus detecting range over which a second amount of defocus is detected, and said second predetermined defocus detecting range being wider than said first predetermined defocus detecting range of said first focus detecting areas;

focus detecting area switching means for switching between said first and second focus detecting areas; and focus detection execution means for performing focus detection based on one of said first and second focus detecting areas, and for outputting a reliability value indicating a reliability of the focus detection, said focus detection execution means executing an operation whereby a position of one of each of the pair of the first and second block pixel strings is shifted a predetermined number of times while the other one of the pair of the first and second block pixel strings is held at more than one of a plurality of fixed positions;

wherein said focus area switching means switches from said first focus detecting areas to said wider second focus detecting areas for further focus detection when the reliability value output by said focus detection execution means is lower than a predetermined value.

3. An automatic focus adjusting device for use in a camera which detects a focus state of an objective lens based on a relative displacement of two images of a subject formed on a photosensor array, said automatic focus adjusting device comprising:

distance determination range setting means for variably setting a detectable amount of defocus;

focus adjusting means for determining a distance to the subject in a first distance determination range, said focus adjusting means executing an operation whereby a position of one of the two images is shifted a predetermined number of times while the other one of the two images is held at more than one of a plurality of fixed positions;

distance determination result decision means for determining a degree of difficulty for performing focus adjustment based on the distance determined by said focus adjusting means; and distance determination operations means for making a distance determination in a second distance determination range larger than said first distance determination range when said distance determination result decision means determines that the degree of difficulty for performing focus adjustment is greater than a predetermined degree of difficulty.

4. The device according to claim 3, wherein said distance determination result decision means determines that the degree of difficulty for performing focus adjustment is greater than the predetermined degree of difficulty when a luminance of the subject is lower than a predetermined luminance.

5. The device according to claim 3, further comprising an assist light source for irradiating the subject with assist light for easier distance determination, and wherein said distance determination result decision means determines that the decree of difficulty for performing focus adjustment is greater than the predetermined degree of difficulty when the assist light is required for distance determination.

6. An automatic focus adjusting device for use in a camera which detects a focus state of an objective lens based on a relative displacement of two images of a subject formed on a photosensor array, said automatic focus adjusting device comprising:

distance determination range setting means for variably setting a detectable amount of defocus;

focus adjusting means for determining a distance to the subject in a first distance determination range set by said distance determination range setting means, said focus adjusting means executing an operation whereby a position of one of the two images is shifted a predetermined number of times while the other one of the two images is held at more than one of a plurality of fixed positions;

distance determination result decision means for deciding whether or not focus adjustment is possible based on the distance determined by said focus adjusting means; and distance measurement operation means for determining the distance to the subject in a second distance determination range larger than said first distance determination range when said distance determination result decision means decides that the focus adjustment is impossible.

7. The device according to claim 6, wherein said distance determination result decision means decides whether or not the focus adjustment is possible based on a reliability coefficient.

8. The device according to claim 6, wherein said distance determination result decision means decides whether or not the focus adjustment is possible based on a reliability coefficient.

9. An automatic focus adjusting device for use in a camera which detects a focus state of an objective lens based on a relative displacement of two images of a subject formed on a photosensor array, said automatic focus adjusting device comprising:

distance determination range setting means for variably setting a detectable amount of defocus;

focus adjusting means for determining a distance to the subject in a first distance determination range set by said distance determination range setting means, said focus adjusting means executing an operation whereby a position of one of the two images is shifted a predetermined number of times while the other one of the two images is held at more than one of a plurality of fixed positions;

distance determination result decision means for deciding whether or not focus adjustment is possible based on the distance determined by said focus adjusting means;

distance determination operation means for determining the distance to the subject in a second distance determination range larger than said first distance determination range when said distance determination result decision means decides that the focus adjustment is impossible; and lens drive means for executing a lens scan when, as a result of redetermination of the distance by said distance redetermination operation means, said distance determination result decision means again decides that the focus adjustment is impossible.

* * * * *